United States Patent [19]

Mahalingam

[11] Patent Number: 6,148,355
[45] Date of Patent: Nov. 14, 2000

[54] CONFIGURATION MANAGEMENT METHOD FOR HOT ADDING AND HOT REPLACING DEVICES

[75] Inventor: Mallikarjunan Mahalingam, Santa Clara, Calif.

[73] Assignee: Micron Electronics, Inc., Boise, Id.

[21] Appl. No.: 08/941,268

[22] Filed: Oct. 1, 1997

Related U.S. Application Data

[60] Provisional application No. 60/046,311, May 13, 1997, and provisional application No. 60/046,491, May 13, 1997.

[51] Int. Cl.[7] ................................................. G06F 13/00
[52] U.S. Cl. ............................................. 710/104; 710/8
[58] Field of Search ............................ 395/283, 284, 395/828; 710/103, 104, 8, 9, 10

[56] References Cited

U.S. PATENT DOCUMENTS

| | | |
|---|---|---|
| 4,057,847 | 11/1977 | Lowell et al. . |
| 4,449,182 | 5/1984 | Rubinson et al. . |
| 4,672,535 | 6/1987 | Katzman et al. . |
| 4,692,918 | 9/1987 | Elliott et al. ............................ 370/85 |
| 4,707,803 | 11/1987 | Anthony, Jr. et al. . |
| 4,769,764 | 9/1988 | Levanon . |
| 4,835,737 | 5/1989 | Herrig et al. . |
| 4,949,245 | 8/1990 | Martin et al. . |
| 4,999,787 | 3/1991 | McNally et al. . |
| 5,006,961 | 4/1991 | Monico . |
| 5,033,048 | 7/1991 | Pierce et al. ........................... 371/21.2 |
| 5,051,720 | 9/1991 | Kittirutsunetorn . |
| 5,121,500 | 6/1992 | Arlington et al. ..................... 395/750 |
| 5,136,708 | 8/1992 | Lapourtre et al. .................... 395/650 |
| 5,138,619 | 8/1992 | Fasang et al. ......................... 371/21.1 |
| 5,157,663 | 10/1992 | Major et al. . |
| 5,210,855 | 5/1993 | Bartol . |
| 5,245,615 | 9/1993 | Treu ....................................... 371/16.5 |
| 5,253,348 | 10/1993 | Scalise . |
| 5,266,838 | 11/1993 | Gerner . |
| 5,269,011 | 12/1993 | Yanai et al. . |
| 5,272,584 | 12/1993 | Austruy et al. . |
| 5,276,863 | 1/1994 | Heider .................................... 395/575 |
| 5,280,621 | 1/1994 | Barnes et al. ........................... 395/800 |
| 5,307,354 | 4/1994 | Cramer et al. . |
| 5,317,693 | 5/1994 | Cuenod et al. . |
| 5,329,625 | 7/1994 | Kannan et al. . |
| 5,337,413 | 8/1994 | Lui et al. . |
| 5,351,276 | 9/1994 | Doll, Jr. et al. . |
| 5,386,567 | 1/1995 | Lien et al. .............................. 395/653 |
| 5,388,267 | 2/1995 | Chan et al. ............................. 395/700 |
| 5,404,494 | 4/1995 | Garney . |
| 5,432,715 | 7/1995 | Shigematsu et al. ............... 364/551.01 |
| 5,432,946 | 7/1995 | Allard et al. . |
| 5,438,678 | 8/1995 | Smith ..................................... 395/750 |
| 5,440,748 | 8/1995 | Sekine et al. . |
| 5,463,766 | 10/1995 | Schieve et al. ........................ 395/650 |

(List continued on next page.)

FOREIGN PATENT DOCUMENTS 0 866 403 A1  9/1998  European Pat. Off. .

OTHER PUBLICATIONS

Davis, T, Usenet post to alt.msdos.programmer, Apr. 1997, "Re: How do I create an FDISK batch file?".

(List continued on next page.)

*Primary Examiner*—Glenn A. Auve
*Attorney, Agent, or Firm*—Knobbe, Martens Olson & Bear, LLP

[57] ABSTRACT

A configuration management system and method for adding or replacing devices in a bus in a computer system. The configuration system creates and maintains a memory structure having bus and device configuration information. The system includes a configuration manager which creates a memory structure containing configuration information for a bus and devices located on the bus within the computer system in which it operates. When a device on the bus is replaced, the configuration manager retrieves the configuration information for the replacement device from the memory structure and uses that information to configure the replacement device. In another aspect of the invention, when a device is added on the bus in the computer system, the configuration manager retrieves selected configuration information for the added device from the memory structure and uses that information to configure the added device.

20 Claims, 8 Drawing Sheets

U.S. PATENT DOCUMENTS

| | | |
|---|---|---|
| 5,471,617 | 11/1995 | Farrand et al. . |
| 5,473,499 | 12/1995 | Weir .................................................. 361/58 |
| 5,483,419 | 1/1996 | Kaczeus, Sr. et al. . |
| 5,485,550 | 1/1996 | Dalton ................................................. 395/51 |
| 5,487,148 | 1/1996 | Komori et al. . |
| 5,491,791 | 2/1996 | Glowny et al. . |
| 5,493,574 | 2/1996 | McKinley . |
| 5,493,666 | 2/1996 | Fitch . |
| 5,513,314 | 4/1996 | Kandasamy et al. .................. 395/182.04 |
| 5,517,646 | 5/1996 | Piccirillo et al. . |
| 5,526,289 | 6/1996 | Dinh et al. . |
| 5,528,409 | 6/1996 | Cucci et al. ..................................... 359/171 |
| 5,533,198 | 7/1996 | Thorson . |
| 5,535,326 | 7/1996 | Baskey et al. ........................... 395/182.02 |
| 5,539,883 | 7/1996 | Allon et al. . |
| 5,546,272 | 8/1996 | Moss et al. .................................... 361/687 |
| 5,548,712 | 8/1996 | Larson et al. ........................... 395/182.05 |
| 5,555,510 | 9/1996 | Verseput et al. ........................... 395/282 |
| 5,559,764 | 9/1996 | Chen et al. ..................................... 396/30 |
| 5,559,958 | 9/1996 | Farrand et al. . |
| 5,559,965 | 9/1996 | Oztaskin et al. . |
| 5,564,024 | 10/1996 | Pemberton . |
| 5,566,339 | 10/1996 | Perholtz et al. ........................... 395/750 |
| 5,568,610 | 10/1996 | Brown . |
| 5,568,619 | 10/1996 | Blackledge et al. . |
| 5,572,403 | 11/1996 | Mills ............................................... 361/695 |
| 5,577,205 | 11/1996 | Hwang et al. . |
| 5,579,487 | 11/1996 | Meyerson et al. ........................ 395/280 |
| 5,579,491 | 11/1996 | Jeffries et al. . |
| 5,581,712 | 12/1996 | Herrman ...................................... 395/283 |
| 5,581,714 | 12/1996 | Amini et al. . |
| 5,584,030 | 12/1996 | Husak et al. ............................... 395/750 |
| 5,588,144 | 12/1996 | Inoue et al. . |
| 5,592,610 | 1/1997 | Chittor . |
| 5,596,711 | 1/1997 | Burckhartt et al. .................. 395/182.21 |
| 5,598,407 | 1/1997 | Bud et al. ................................... 370/330 |
| 5,606,672 | 2/1997 | Wade . |
| 5,608,876 | 3/1997 | Cohen et al. . |
| 5,615,207 | 3/1997 | Gephardt et al. . |
| 5,621,159 | 4/1997 | Brown et al. ............................... 73/9 |
| 5,621,892 | 4/1997 | Cook . |
| 5,622,221 | 4/1997 | Genga, Jr. et al. ....................... 165/208 |
| 5,625,238 | 4/1997 | Ady et al. .................................... 307/147 |
| 5,627,962 | 5/1997 | Goodrum et al. ..................... 395/182.11 |
| 5,629,947 | 5/1997 | Kellum et al. . |
| 5,630,076 | 5/1997 | Saulpaugh et al. ..................... 395/284 |
| 5,631,847 | 5/1997 | Kikinis ........................................ 364/514 R |
| 5,632,021 | 5/1997 | Jennings et al. . |
| 5,638,289 | 6/1997 | Yamada et al. . |
| 5,644,470 | 7/1997 | Benedict et al. . |
| 5,644,731 | 7/1997 | Liencres et al. . |
| 5,651,006 | 7/1997 | Fujino et al. . |
| 5,652,832 | 7/1997 | Kane et al. . |
| 5,652,839 | 7/1997 | Giorgio et al. .......................... 395/200.11 |
| 5,652,892 | 7/1997 | Ugajin . |
| 5,652,908 | 7/1997 | Douglas et al. ........................... 395/800 |
| 5,655,081 | 8/1997 | Bonnell et al. . |
| 5,655,083 | 8/1997 | Bagley ...................................... 395/182.31 |
| 5,655,148 | 8/1997 | Richman et al. . |
| 5,659,682 | 8/1997 | Devarakonda et al. . |
| 5,664,118 | 9/1997 | Nishigaki et al. ........................ 395/283 |
| 5,664,119 | 9/1997 | Jeffries et al. . |
| 5,666,538 | 9/1997 | DeNicola . |
| 5,668,992 | 9/1997 | Hammer et al. ......................... 395/651 |
| 5,669,009 | 9/1997 | Buktenica et al. .................... 395/800.35 |
| 5,671,371 | 9/1997 | Kondo et al. . |
| 5,675,723 | 10/1997 | Ekrot et al. . |
| 5,680,288 | 10/1997 | Carey et al. . |
| 5,684,671 | 11/1997 | Hobbs et al. . |
| 5,689,637 | 11/1997 | Johnson et al. . |
| 5,696,899 | 12/1997 | Kalwitz . |
| 5,696,970 | 12/1997 | Sandage et al. . |
| 5,715,456 | 2/1998 | Bennett et al. ............................ 395/652 |
| 5,724,529 | 3/1998 | Smith et al. . |
| 5,726,506 | 3/1998 | Wood . |
| 5,727,207 | 3/1998 | Gates et al. ................................ 395/651 |
| 5,732,266 | 3/1998 | Moore et al. ............................. 395/651 |
| 5,737,708 | 4/1998 | Grob et al. ................................. 455/557 |
| 5,740,378 | 4/1998 | Rehl et al. . |
| 5,742,833 | 4/1998 | Dea et al. . |
| 5,747,889 | 5/1998 | Raynham et al. . |
| 5,748,426 | 5/1998 | Bedingfield et al. . |
| 5,752,164 | 5/1998 | Jones ........................................... 455/33.1 |
| 5,754,797 | 5/1998 | Takahashi . |
| 5,758,165 | 5/1998 | Shuff ............................................ 395/712 |
| 5,761,033 | 6/1998 | Wilhelm . |
| 5,761,045 | 6/1998 | Olson et al. . |
| 5,761,085 | 6/1998 | Giorgio ....................................... 364/505 |
| 5,761,462 | 6/1998 | Neal et al. . |
| 5,764,968 | 6/1998 | Ninomiya . |
| 5,765,008 | 6/1998 | Desai et al. . |
| 5,765,198 | 6/1998 | McCrocklin et al. . |
| 5,768,541 | 6/1998 | Pan-Ratzlaff . |
| 5,768,542 | 6/1998 | Enstrom et al. . |
| 5,774,741 | 6/1998 | Choi . |
| 5,777,897 | 7/1998 | Giorgio ....................................... 364/557 |
| 5,778,197 | 7/1998 | Dunham . |
| 5,781,703 | 7/1998 | Desai et al. . |
| 5,781,744 | 7/1998 | Johnson et al. ........................... 395/283 |
| 5,781,767 | 7/1998 | Inoue et al. . |
| 5,781,798 | 7/1998 | Beatty et al. . |
| 5,784,555 | 7/1998 | Stone .......................................... 395/200.5 |
| 5,784,576 | 7/1998 | Guthrie et al. . |
| 5,787,019 | 7/1998 | Knight et al. ............................. 364/550 |
| 5,787,459 | 7/1998 | Stallmo et al. ........................... 711/112 |
| 5,787,491 | 7/1998 | Merkin et al. ............................ 711/173 |
| 5,790,775 | 8/1998 | Marks et al. . |
| 5,790,831 | 8/1998 | Lin et al. . |
| 5,793,987 | 8/1998 | Quackenbush et al. . |
| 5,794,035 | 8/1998 | Golub et al. . |
| 5,796,185 | 8/1998 | Takata et al. . |
| 5,796,580 | 8/1998 | Komatsu et al. ........................ 361/687 |
| 5,796,981 | 8/1998 | Abudayyeh et al. . |
| 5,797,023 | 8/1998 | Berman et al. ...................... 395/750.06 |
| 5,798,828 | 8/1998 | Thomas et al. . |
| 5,799,036 | 8/1998 | Staples . |
| 5,801,921 | 9/1998 | Miller . |
| 5,802,269 | 9/1998 | Poisner et al. . |
| 5,802,298 | 9/1998 | Imai et al. ............................... 395/200.47 |
| 5,802,305 | 9/1998 | McKaughan et al. . |
| 5,802,324 | 9/1998 | Wunderlich et al. . |
| 5,802,393 | 9/1998 | Begun et al. . |
| 5,802,552 | 9/1998 | Fandrich et al. . |
| 5,802,592 | 9/1998 | Chess et al. ............................... 711/164 |
| 5,803,357 | 9/1998 | Lakin ........................................... 236/78 B |
| 5,805,834 | 9/1998 | McKinley et al. . |
| 5,809,224 | 9/1998 | Schultz et al. . |
| 5,809,287 | 9/1998 | Stupek, Jr. et al. ...................... 395/500 |
| 5,809,311 | 9/1998 | Jones ....................................... 395/750.01 |
| 5,812,748 | 9/1998 | Ohran et al. . |
| 5,812,750 | 9/1998 | Dev et al. . |
| 5,812,757 | 9/1998 | Okamoto et al. . |
| 5,812,858 | 9/1998 | Nookala et al. . |
| 5,815,117 | 9/1998 | Kolanek . |
| 5,815,647 | 9/1998 | Buckland et al. .................. 395/182.01 |
| 5,815,652 | 9/1998 | Ote et al. . |
| 5,821,596 | 10/1998 | Miu et al. ................................... 257/419 |
| 5,822,547 | 10/1998 | Boesch et al. ............................. 395/283 |
| 5,835,719 | 11/1998 | Gibson et al. . |
| 5,835,738 | 11/1998 | Blackledge, Jr. et al. . |
| 5,838,932 | 11/1998 | Alzien . |
| 5,841,991 | 11/1998 | Russell . |

| | | |
|---|---|---|
| 5,852,720 | 12/1998 | Gready et al. . |
| 5,852,724 | 12/1998 | Glenn, II et al. ............... 395/200.69 |
| 5,857,074 | 1/1999 | Johnson . |
| 5,857,102 | 1/1999 | McChesney et al. .............. 395/653 |
| 5,864,653 | 1/1999 | Tavallaei et al. ................. 315/181 |
| 5,875,307 | 2/1999 | Ma et al. ......................... 395/281 |
| 5,875,310 | 2/1999 | Buckland et al. . |
| 5,878,238 | 3/1999 | Gan et al. . |
| 5,881,311 | 3/1999 | Woods . |
| 5,884,027 | 3/1999 | Garbus et al. ................... 395/200.8 |
| 5,889,965 | 3/1999 | Wallach et al. .................. 395/283 |
| 5,892,928 | 4/1999 | Wallach et al. .................. 395/283 |
| 5,898,888 | 4/1999 | Guthrie et al. ................... 395/308 |
| 5,905,867 | 5/1999 | Giorgio ........................... 395/200.54 |

OTHER PUBLICATIONS

Davis, T., Usenet post to alt.msdos.batch, Apr. 1997, "Re: Need help with automating FDISK and FORMAT . . . ".

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novel® NetWare® 4.1 SMP, 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/Rev 8a, pp. i, iii–x, 1–76, and I–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

"CAN: Technical Overview", NRTT, Ltd. Sep. 23, 1997, 15 pp.

M.J. Schofield, "Controller Area Network—How CAN Works", mschofield@cix.compulink.co.uk, Sep. 23, 1997, 4 pp.

"DECchip 21050 PCI–to–PCI Bridge Data Sheet Update", Digital Equipment Corporation, Jun. 1994.

"Detailed Overview of the PC Card Standard", www.pc-–card.com/stand_overview.html#1, Sep. 30, 1997, 9 pp.

Goble, et al., "Intelligent I/O Architecture $I_2O$", Jun. 1996, 22 pp.

Lockareff, "Lonworks—An Introduction", HTI News, Dec. 1996, 2 pp.

Goodrum, "PCI Bus Hot Plug Specification", PCI SIG Membership, Jun. 15, 1997, 29 pp.

Compaq Computer Corporation "Plug and Play BIOS Specification", Version 1.0A, May 5, 1994, 56 pp.

Microsoft Corporation, "Supporting Removable Devices Under Windows and Windows NT", Sep. 15, 1997, 4 pp.

NetFrame Systems, Inc. News Release/Brochures, 14 pp.

CONFIGURATION MANAGEMENT METHOD FOR HOT ADDING AND HOT REPLACING DEVICES

RELATED APPLICATIONS

The subject matter of U.S. patent application entitled "Configuration Management System for Hot Adding and Hot Replacing Devices", filed on Oct. 1, 1997, application Ser. No. 08/942,408.

PRIORITY CLAIM

The benefit under 35 U.S.C. § 119(e) of the following U.S. provisional application(s) is hereby claimed:

| Title | Application No. | Filing Date |
|---|---|---|
| "Hot Plug Software Architecture for Off the Shelf Operating Systems" | 60/046,311 | May 31, 1997 |
| "Means for Allowing Two or More Network Interface Controller Cards to Appear as One Card to an Operating System" | 60/046,491 | May 13, 1997 |

INCORPORATION BY REFERENCE OF COMMONLY OWNED APPLICATIONS

The following patent applications, commonly owned and filed on the same day as the present application are hereby incorporate herein in their entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Disturbed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for The Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing a Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |

-continued

| Title | Application No. | Attorney Docket No. |
|---|---|---|
| "Alert Configuration and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Application" | 098/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to computer systems. Additionally, the invention relates to configuration space management for computer servers.

2. Description of the Related Technology

A server is a central computer in a network which manages the common data and supplies this data to workstations in the network. Current operating systems for servers do not by themselves provide the support users need to hot add and swap devices. Hot add refers to the addition of a device on a bus on the server while the server continues to operate. Hot replace refers to the replacement of a device on a bus of the server while the server continues to operate. Hot swap refers to a hot replace with the replacement device being identical to the replaced device. There is a need for the hot add and hot swap capabilities in order to avoid expensive server down time when replacing or adding devices to the server. Such devices include various peripheral devices such as mass storage and network adapters. Such devices are commonly interfaced with the server through various bus systems such as Peripheral Component Interconnect, CardBus, Microchannel, Industrial Standard Architecture (ISA), and Extended ISA (EISA).

One aspect of hot adding and hot swapping of devices that needs to be addressed is the system configuration. In the past in certain bus architectures, the system configuration was fixed prior to system initialization. However, such an approach does not support hot add or hot swap. Such systems also do not provide the ability to change the configuration parameters dynamically through a software interface. When performing a hot swap or hot add on a PCI bus, care must be taken to ensure that resources, such as, memory and I/O space, allocated to the new device do not conflict with concurrently assigned devices. Prior systems have required that for the replacement of a device or the addition of a device, the entire system be powered down, devices be replaced or added, and then the system be powered up and reconfigured.

There is a need for a methods and systems which facilitate the replacement and adding of a devices on a bus on the server while the server continues to operate. There is also a need for systems and methods to ensure that resources, such as, memory and I/O space, allocated to the replacement devices and added devices do not conflict with concurrently assigned devices.

SUMMARY OF THE INVENTION

The invention addresses the above and other needs by providing a configuration system and method, which in one embodiment includes a configuration manager that creates a memory structure containing configuration information for a bus and devices located on the bus within the computer system in which it operates. When a device on the bus is replaced, the configuration manager retrieves the configuration information for the replacement device from the memory structure and uses that information to configure the replacement device. In another aspect of the invention, when a device is added on the bus in the computer system, the configuration manager retrieves selected configuration information for the added device from the memory structure and uses that information to configure the added device.

DETAILED DESCRIPTION OF THE INVENTION

The invention will be described in terms of exemplary embodiments adapted to operate with particular computer systems. However, it will be clear to those skilled in the art that the principles of the invention can be utilized in other computer systems where it is desired to use and maintain configuration information. The exemplary embodiments are described below in further detail with reference to the Figures, wherein like elements are referenced by like numerals throughout.

One specific environment in which the invention can be utilized is described in application Ser. No. 08/942,309, entitled "Hot Add of Devices Software Architecture" incorporated by reference above and is described below in general terms to provide the reader with an example of a specific application of the invention. However, the invention can be utilized in various other systems.

Figure 1:
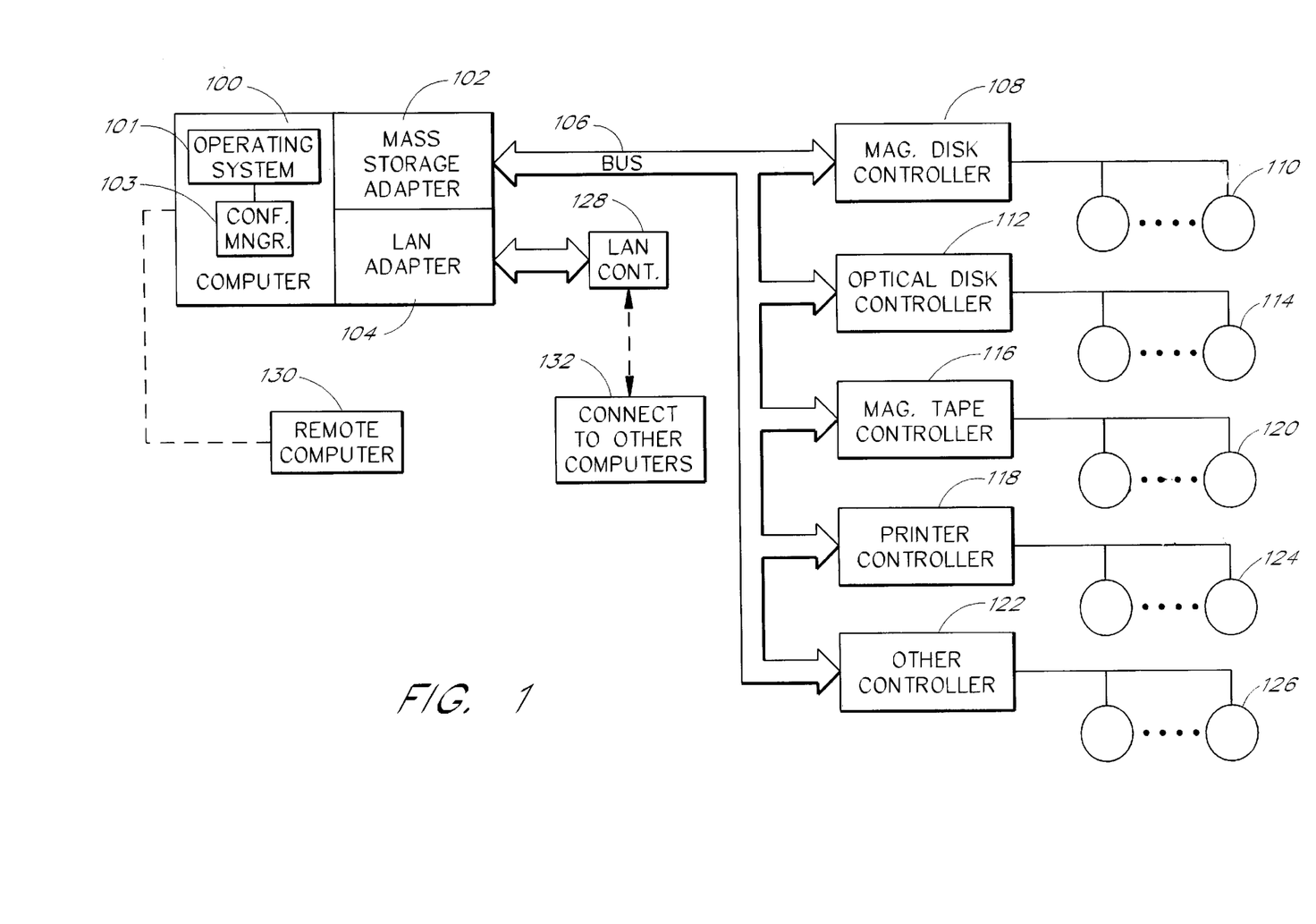
FIG. 1 is a block diagram of a computer system employing an embodiment of the invention.

FIG. 1 is a block diagram of a computer system which incorporates an embodiment of the invention. The system includes a computer 100 connecting to a mass storage adapter 102 and a Local Area Network (LAN) adapter 104. The overall operation of the computer is managed by an industry standard operating system 101 such as Windows® NT, NetWare®, Disk Operating System (DOS), or UNIX®. Operating under the operating system is a configuration manager program 103. The system may include a remote computer 130 which is in communication with computer 100 via a telephone link. The mass storage adapter 102 may contain various types of device controllers including, for example: a magnetic disk controller 108 for magnetic disks 110, an optical disk controller 112 for optical disks 114, a magnetic tape controller 116 for magnetic tapes 124, a printer controller 120 for various printers 122, and any other type of controller 122 for other devices 126. The LAN adapter 104 may include a LAN controller 128. Vendors for a magnetic disk controller 108 and magnetic disks 110 include Qlogic, Intel, and Adaptec.

The LAN adapter 104 allows digital communication between the computer system and other computers (not shown) such as a network of servers via a connection 130. Typically, slots of the LAN adapter 104 and the slots of the mass storage adapter are contained on the same bus system. In different embodiments of the invention, various bus systems can be employed such as the Peripheral Component Interconnect (PCI), Microchannel, Small Computer system Interface (SCSI), Industrial Standard Architecture (ISA) and Extended ISA (EISA) architectures.

Figure 2:
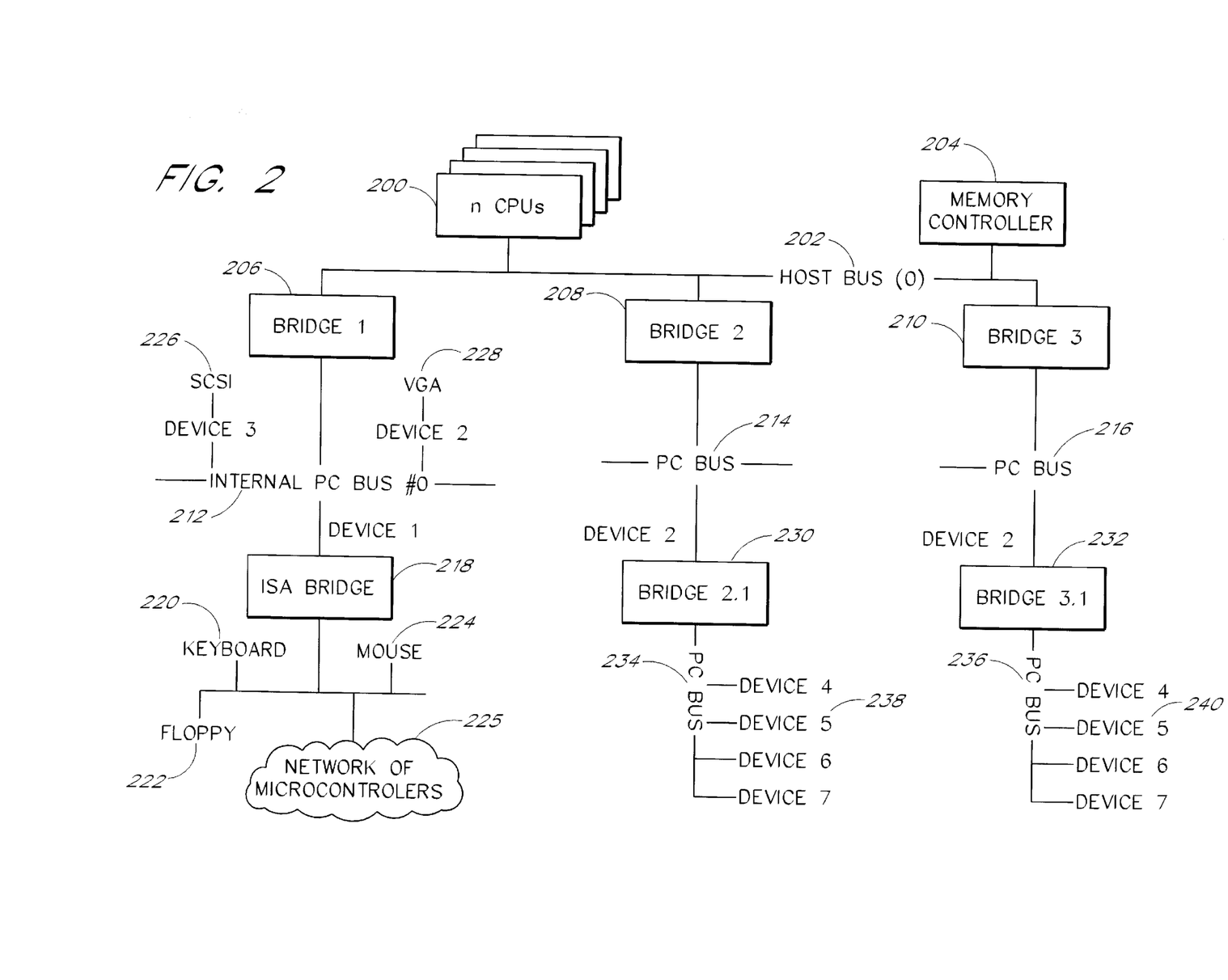
FIG. 2 is a block diagram of a multiple bus computer configuration connected to a network of microcontrollers all of which are associated with the computer shown in FIG. 1.

FIG. 2 shows an embodiment of the bus structure of the computer 100. A number 'n' of central processing units (CPUs) 200 are connected through a host bus 202 to a memory controller 204. Bridges 206, 208 and 210 connect the host bus to three additional bus systems 212, 214, and 216. Bus systems 212, 214 and 216 may be any conventional bus system such as PCI, ISA, EISA and Microchannel. In one embodiment of the invention, the bus system 212 is PCI to support an internal VGA card or a SCSI device (referred to generally herein as "PC buses").

The ISA Bridge 218 is coupled to the bus system 212 so as to support legacy devices such as a keyboard 220, one or more floppy disk drives 222 and a mouse 224. In one embodiment a network of microcontrollers 225 is interfaced to the ISA bus 226 as is described in U.S. patent application Ser. No. 08/942,309, incorporated by reference above. Bridge 230 and bridge 232 couple PC buses 214 and 216 with PC buses 234 and 236, respectively, to provide expansion slots for peripheral devices or adapters. Having separate PC buses 234 and 236 eliminates the potential that a device driver or other transient I/O error on one of those buses will bring the entire system to a stop or stop the system administrator from communicating with the system.

Figure 3:
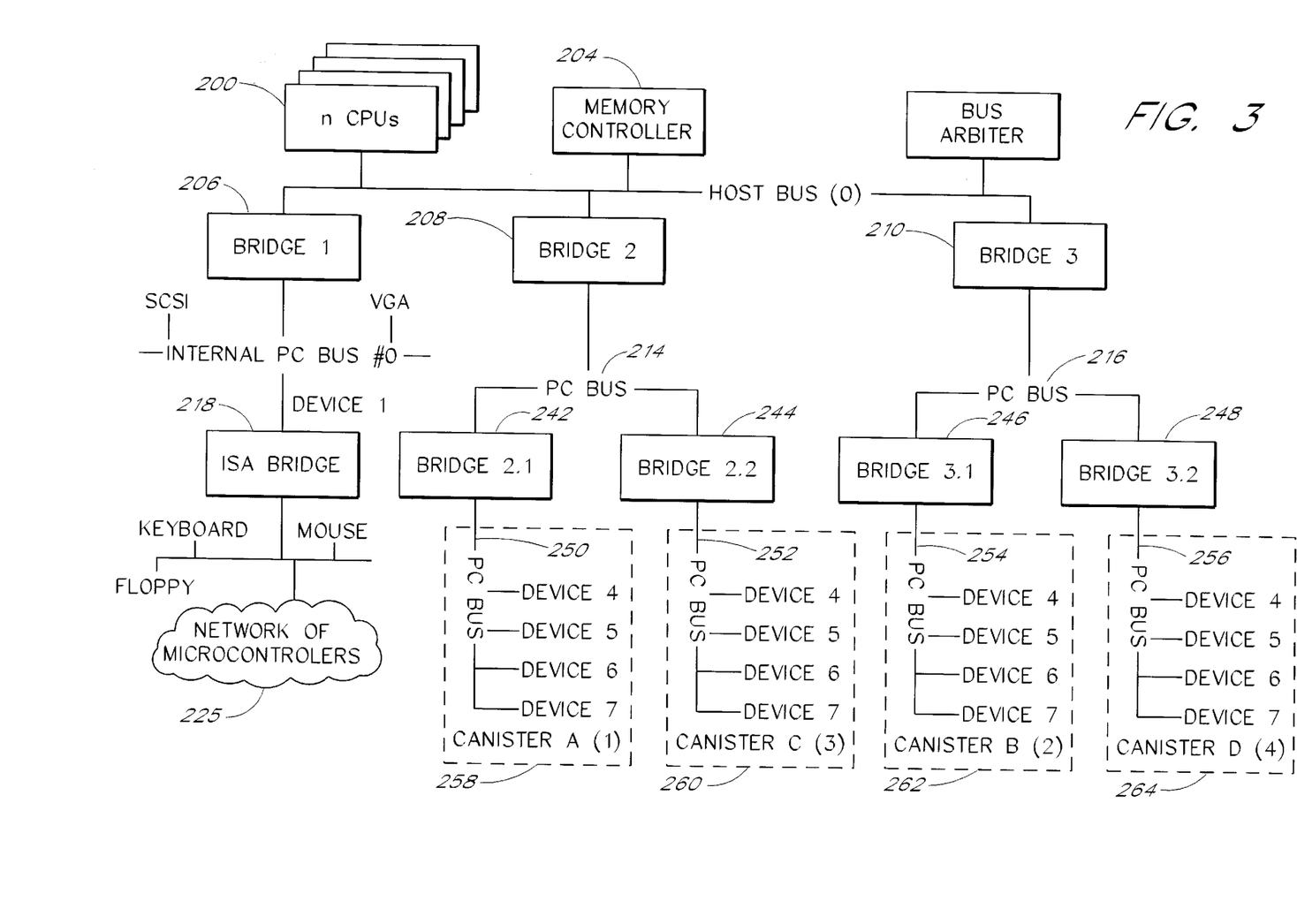
FIG. 3 is a block diagram showing a multiple bus computer architecture with canisters connected to a network of microcontrollers which are all associated with the computer shown in FIG. 1.

FIG. 3 shows another bus structure embodiment of the computer 100. PC bus 214 and 216 include bridges 242, 244, 246, 246 and 248 which are connected, respectively, to PC bus systems 250, 252, 254, and 256. As were PC bus systems 214 and 216, PC bus systems 250, 252, 254 and 256 can be designed according to any type of bus architecture including PCI, ISA, EISA, and Microchannel. PC buses 250, 252, 254, and 256 are each implemented on one of a group of canisters 258, 260, 262 and 264. Canisters 258, 260, 262, and 264 comprise casings for a detachable bus system.

A memory structure according to one embodiment of the invention will now be described with reference to FIG. 4. In general, the memory structure includes the PCI configuration information required to perform hot add and hot swap of devices on the PCI buses. The information includes the configuration information that is stored in the general purpose configuration registers on the PCI devices.

Figure 4:
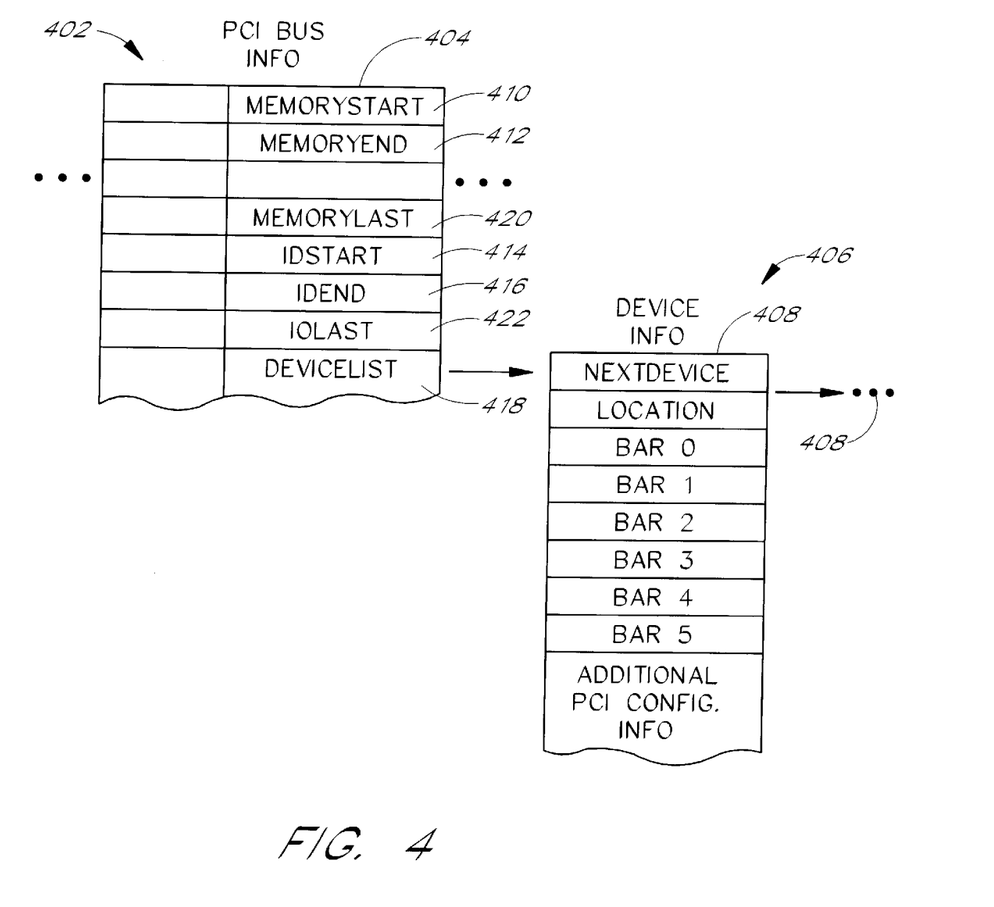
FIG. 4 is a block diagram of a memory structure including configuration information.

Referring to FIG. 4, the memory structure is in the form of an array 402 with each array element, e.g., 404, of the array representing a PCI bus in the system. Each element of the array is referred to as a PCI bus information structure. A linked list 406 is attached to each array element. The elements 408 of the linked list represent devices on the PCI bus. In one embodiment, the memory structure is located in the main memory of the operating system and is created and maintained by the configuration manager 103 (FIG. 1).

Each PCI bus array element 404 may include the memory start and end locations 410, 412 for that bus, the I/O start and end locations 414, 416 for that bus, and a pointer 418 to the linked list 408 containing the configuration information for devices on that bus. In addition, the bus memory structure may include the memory location of the last memory space 420 assignment performed on that bus. That information may be used when hot adding a device to the bus. In one embodiment, when memory is allocated for devices on a bus, the memory is allocated from the highest address to the lowest. Therefore, the last address allocated is also the smallest address allocated. Similarly, the last I/O address allocated 422 may also be stored in that array structure. The PCI bus information structure may also include configuration information defined by the PCI standard under which the system is operating.

Each element 408 on the linked list 406 attached to each PCI bus information structure is referred to as a device information structure. Each device information structure typically contains PCI configuration information for a specific device on the bus corresponding to the PCI bus information structure to which the linked list is attached. The PCI configuration information is governed by the PCI specification. As an example, the device information structure includes the PCI vendor identification, PCI device identification, PCI command, PCI status, PCI revision identification, PCI class code, PCI cache line size, PCI latency timer, and the base register addresses (BAR's). Each device information structure in the linked list may also include a pointer to the next device information structure in the linked list or a null indicating the end of the list.

Figure 5:
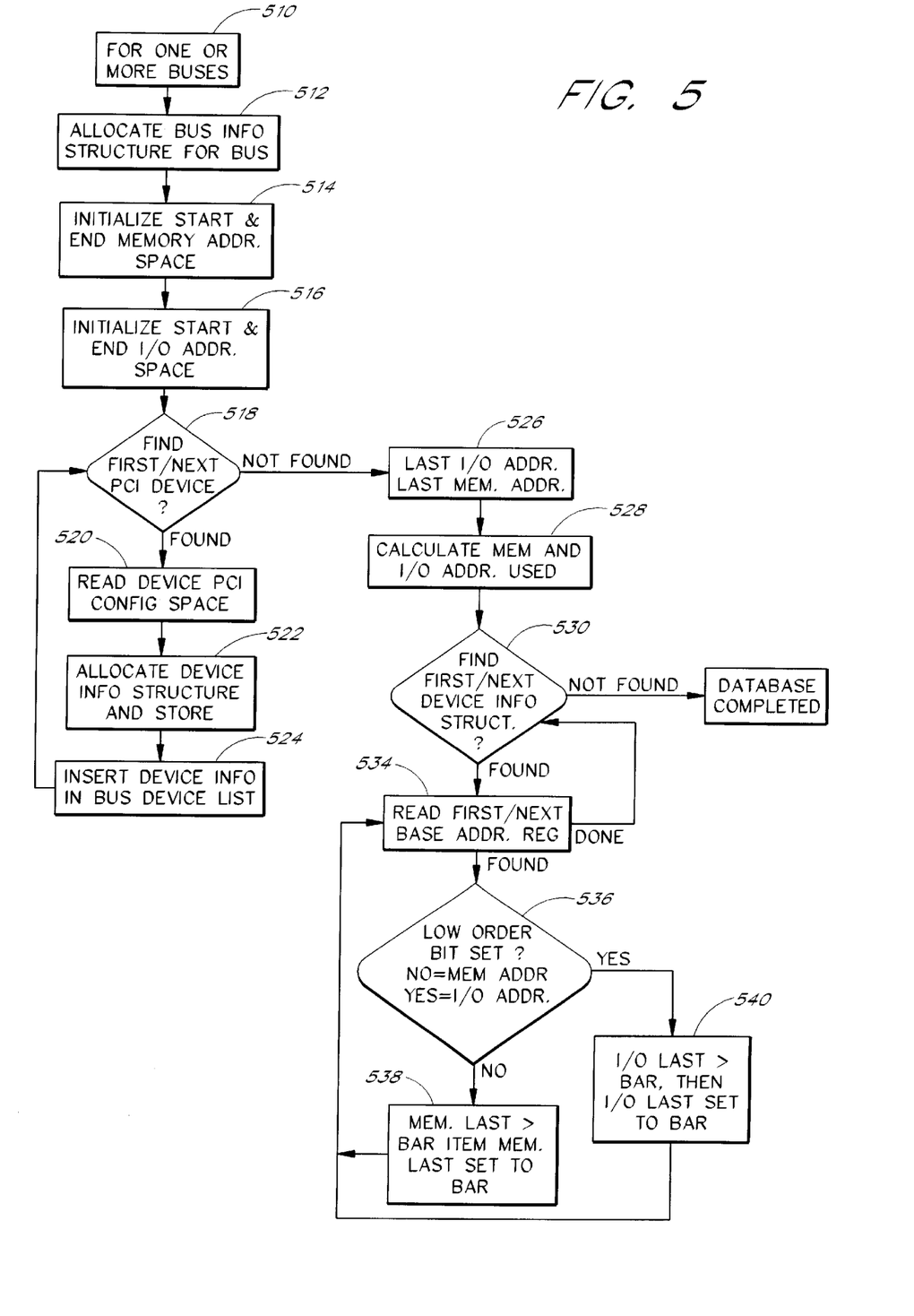
FIG. 5 is a flowchart depicting the process followed in one embodiment of the invention for creating the configuration space data structure depicted in FIG. 4.

Referring now to FIG. 5, there is depicted a flowchart which illustrates one inventive method for creating the PCI configuration space data structure depicted in FIG. 4. FIG. 5 represents the steps which may be accomplished by the configuration manager 103 operating within the computer system 100.

As indicated by box 510, the process indicated and represented by FIG. 5 is carried out for one or more buses on the system. At step 512, space in the memory of the computer 100 (see FIGS. 1 and 2) is allocated for the memory structure. This allocation can be performed at the time of compiling or dynamically.

Next, at step 514 the predefined start and end memory addresses for the PCI bus are written to the array element representing that PCI bus. The start and end memory addresses may be the same as those used when the system is initialized by the BIOS program during system boot-up.

Then, at step 516, the predefined start and end input/output ("I/O") addresses and the interrupt assignment (ISA IRQ) for the bus are written in the appropriate locations in the array element representing the PCI bus. As with the start and end memory addresses, the start and end I/O addresses and the interrupt assignment may also be the same as those used by the BIOS program when the system was initialized.

As represented by steps 518, 520, 522 and 524, a repeated process or loop is next performed where each device number from 0 to 31 and function number from 0 to 7 is reviewed sequentially to determine whether such a device exists on the current bus and whether that device supports more than one function. At the first part of that loop, at step 518, a standard PCI configuration access (query) is performed, which determines whether, for example, device 0, is present on the bus. If a device is located with that device number, the process continues to step 520 wherein the PCI configuration space information of that device is then read from that device including whether any other function numbers (0–7) are supported by the device.

Next, at step 522 memory space is allocated for the device information structure for that device and the PCI configuration information read from the device is then copied into the allocated device information structure. At step 524 that device information structure is linked into the list either by inserting a pointer into the corresponding bus information structure if this is the first device, or inserting the pointer into the next device location of the previous device information structure in the linked list for this bus. After step 524 is completed, the process returns to step 518 where the system may attempt to locate the next PCI device on the bus. This process or loop may be repeated for each device on the PCI bus. In this manner, a linked list of PCI devices with each element in the list containing configuration information is created in the form depicted in FIG. 4.

After the last PCI device on the bus has been added to the linked list, the process proceeds to step 526. In this step the last I/O address in the PCI bus information structure 422 (see FIG. 4) and the last memory address 420 in the PCI bus information structure are set, respectively, to the memory end 412 and the I/O end 416 addresses.

Next, in step 528, the amount of memory and I/O address space used by all of the PCI devices on the bus may be determined. In one embodiment, the amount of memory and I/O address space used is determined by tracking the last memory and I/O address space assigned. The process for making those determinations is performed in steps 530 through 544. Generally speaking, the process for determining the amount of memory an I/O address used by the PCI devices on the bus includes looking at each of the base address registers on each of the devices on the bus and determining the lowest base address register value for an I/O and the lowest base address register value for memory.

Specifically, at step 530, the process locates the first device information structure on the bus by scanning the linked list attached to the bus information structure or, if the first device information structure has already been processed, the process looks for the next device information structure. If no device information structure is found, the process is complete.

When a device information structure is located at step 530, then at step 534, the data in the device information structure representing the first base address register is read. If the first base address register has already been read, the process attempts to read the next base address register. If no further base address registers exist, the process then returns to step 530.

When a base register is found and read in step 534, the process proceeds to the step represented by box 536. Under the PCI configuration standard, if the low order bit of a base address register is set, then that base register represents an I/O address and the process then proceeds to step 540. In step 540, the base address register contents are masked with the hexadecimal number 0X FFFFFFFE (per the PCI specification) and a comparison is made between that value and the last I/O address in the bus information structure. If that masked value is a lower value, it is then written to the last I/O address in the bus information structure. The process then returns to step 534.

However, if the low order bit in the base address register is not set, then the base address register represents a memory address and the process proceeds to step 538. In step 538, the contents of the base address register are masked with the hexadecimal number 0XFFFFFFF0 (per the PCI specification) and then compared with the contents of the last memory address in the bus information structure. If that masked value is a lower value, it is then written to the last memory address in the bus information structure. The process then returns to step 534.

As represented by box 534, this process is repeated for each of the base registers located on a device. After the last base address register has been analyzed according to steps 536, 538, 540, the process returns to step 530 and the foregoing process is repeated for each device on the bus. This process thereby determines the lowest address for both I/O and memory used by the devices on the bus. The process proceeds in this manner because memory for the devices is allocated from the highest address to the lowest. After this has been completed, the PCI configuration initialization process is completed.

Figure 6:
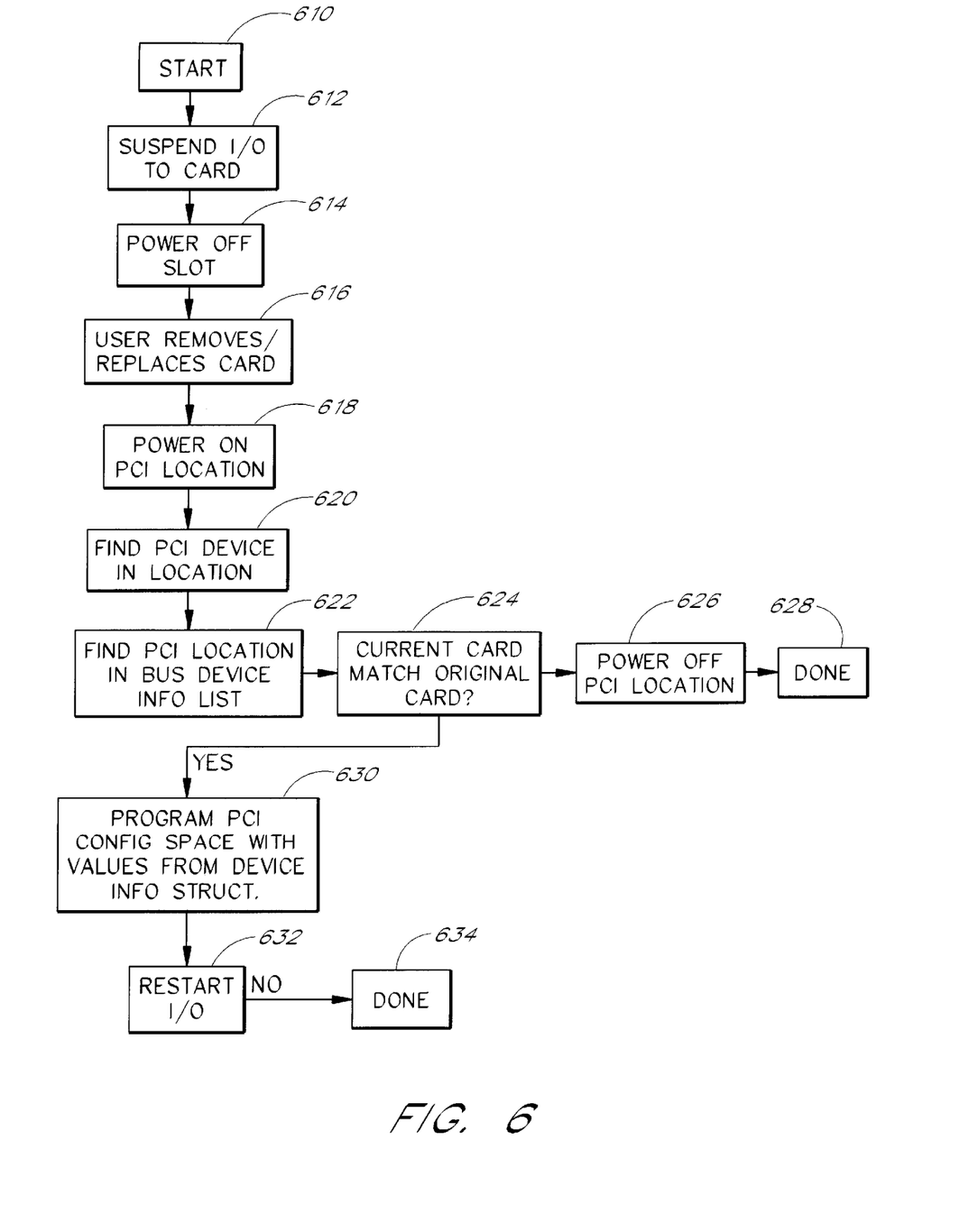
FIG. 6 is a flowchart depicting the process followed in one embodiment of the invention relating to hot swap.

Turning now to FIG. 6, the aspects of the invention relating to its use in connection with the hot swap of a card or device on a PCI bus will be described. FIG. 6 represents the steps which are accomplished by the configuration manager 103 operating within the computer system. The following description of the process of a hot swap in a PCI bus system focuses on the details which relate directly to the configuration space.

As represented by box 610 in FIG. 6, the hot swap process is typically initiated by a system user request. The configuration manager may provide the driver with the information which defines the device to be swapped, such as the PCI bus number, the device number, the functions supported by the device, and identifies the slot in which the device resides. At step 612 the I/O to the card which is to be swapped out is suspended or frozen. Next, at step 614, power to the slot holding the card to be swapped out is turned off. Then at step 616, the user physically removes the card and replaces it with the replacement card. Next, at step 618, the power to that slot is turned back on.

At step 620 the replacement card in the slot is queried to return the vendor identification and the device identification of the card installed in the slot using standard PCI configuration access known to those of ordinary skill in the art.

Next, at step 622, the location of this card on the bus is located in the bus device information structure 404 (see FIG. 4). That is accomplished by locating the array element corresponding to the bus and then traversing the linked list linked to that array element until the PCI location (typically identified by bus number, device number and function number) corresponding to the current location of interest is located. Then, at step 624 the vendor identification and device identification which was read from the replacement card is compared to the vendor ID and device ID in the device information structure corresponding to the slot of interest. If those values are not the same, an improper swap has been attempted in that the replacement card is not identical to the card previously located in the slot. The system then proceeds to step 626 wherein power to that slot is turned off. The process then proceeds to step 628 wherein an error message is generated and the process terminates.

However, if the vendor identification and the device identification of the card currently located in the slot of interest and the vendor ID and device ID in the device information structure corresponding to that slot are identical, the process proceeds to step 630. At step 630 the PCI configuration space information stored in the device information structure is written to the replacement device. Then, at step 632, I/O to the slot is restarted. At that point, as represented by box 634, the hot swap is completed.

Figures 7, 7A:
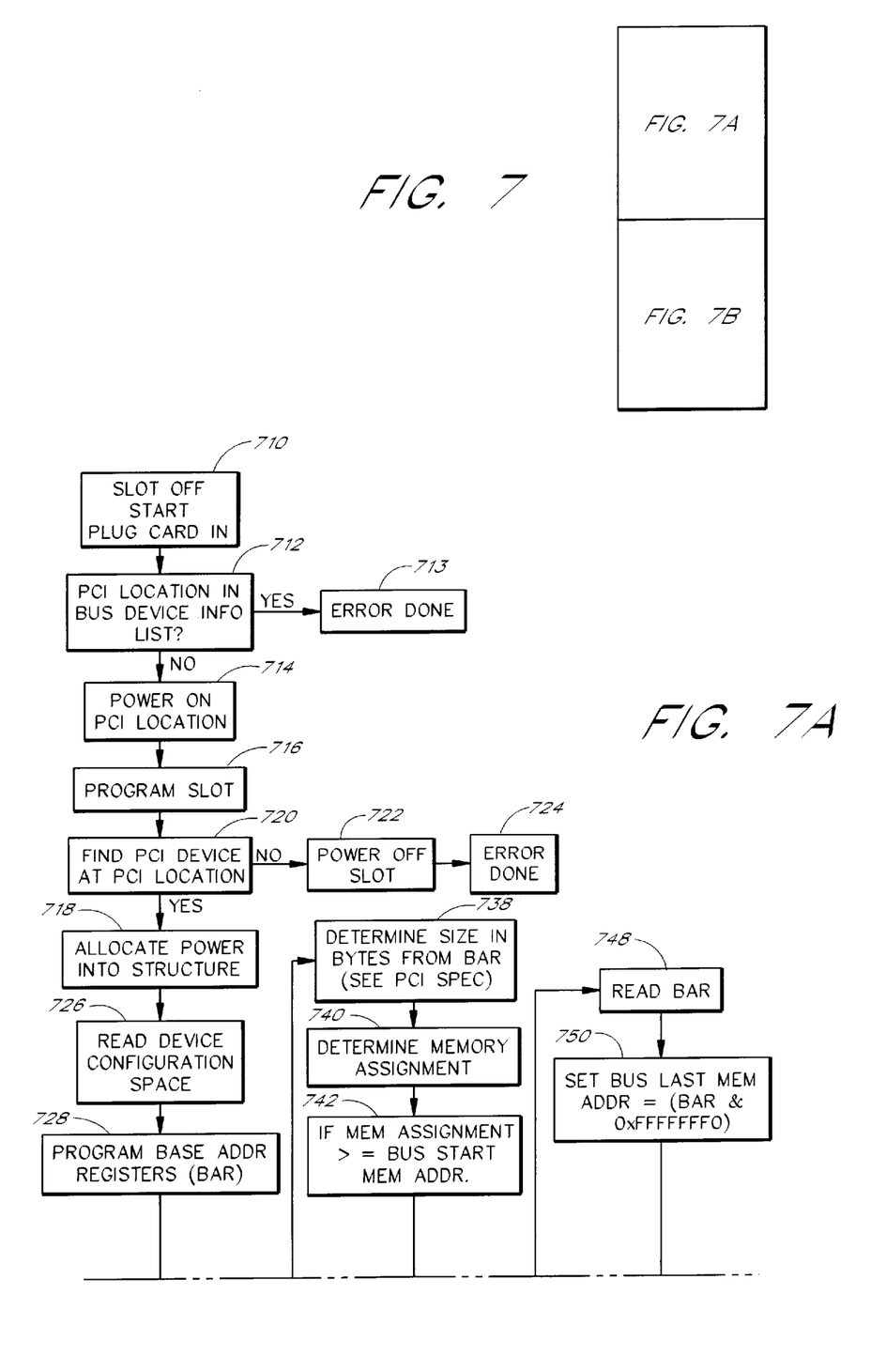
FIGS. 7A and 7B are flowcharts depicting the process followed in one embodiment of the invention relating to hot addition.
Figure 7B:
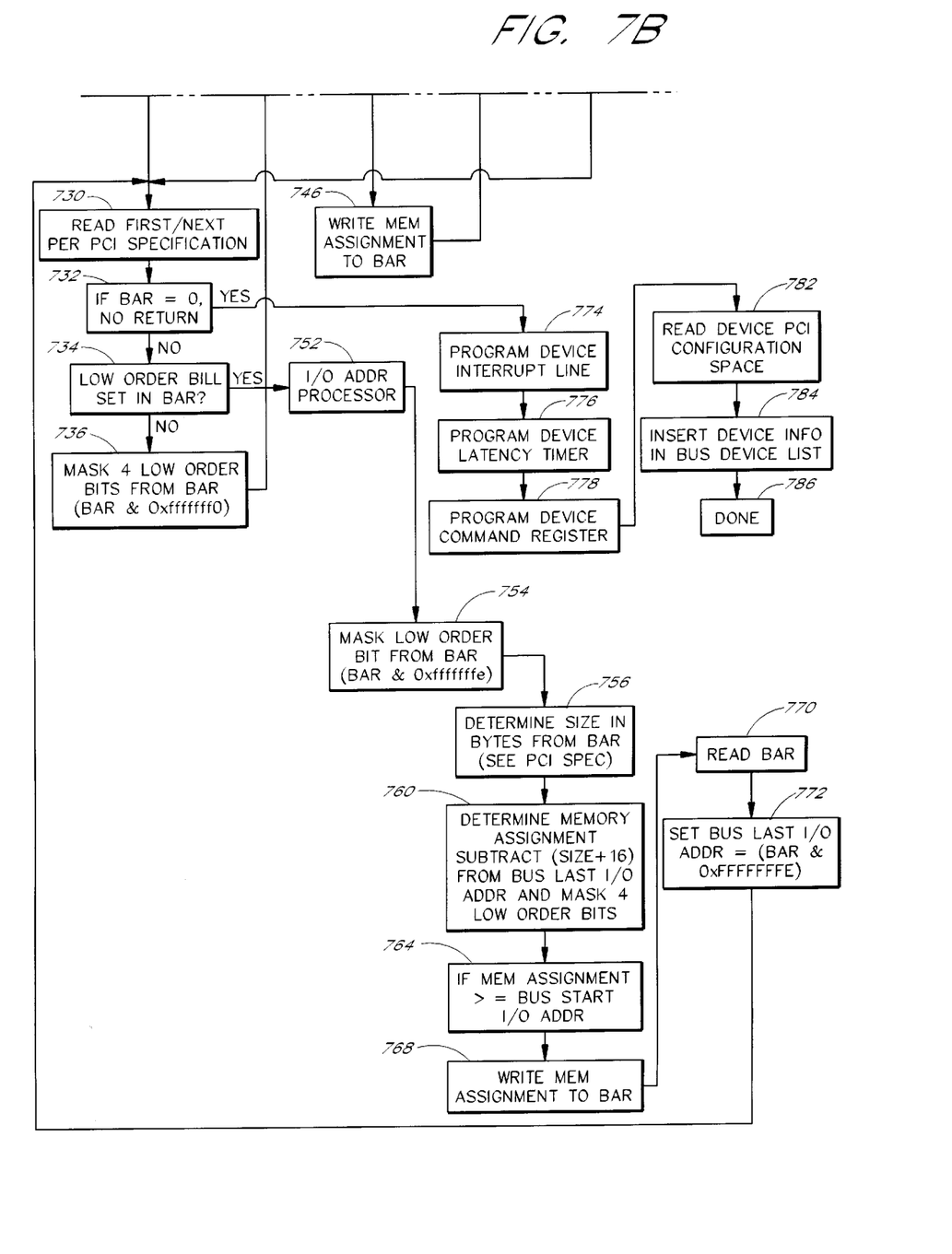

Referring now to FIGS. 7A and 7B, the process for the hot addition of a device to the PCI bus will be described. The flowcharts represent the steps which may be accomplished by the configuration manager 103 operating within the computer system. Again, the description focuses upon those aspects of the hot addition which specifically relate to the PCI configuration space.

In general, the process for performing a hot add is similar to the steps that occur with regard to each device on a bus during system initialization associated with boot-up. However, generally speaking, the process differs in that rather than initializing every device in the system, the capability exists to initialize any device because configuration information is available and maintained in the PCI configuration space by the configuration manager.

As represented by step 710, the power to the slot of interest should be turned off and the card to be added is then inserted into that slot. Next, at step 712, the memory structure represented in FIG. 4 is reviewed to determine whether the PCI location representing the slot into which the card was added is already identified in that structure. If the answer is yes, the process continues to step 713 wherein a system error message is initiated. However, because that slot was empty, no entry for that slot should be present in the memory structure. Therefore, typically step 714 would be performed next. At step 714 power is typically restored to the slot of interest. Next, at step 716, the card is initialized. The individual steps for this process are represented by boxes 720 through 786.

First, at step 720, a system query is sent to attempt to locate or read the newly added device. If the device cannot be read by the system, the process continues to step 722, wherein the power to that slot is turned off. Next, at step 724, an error message is generated and the process ends.

However, if the device is located in response to the system query, the process proceeds to step 725, wherein, memory space is allocated for what will be the device information structure for the newly added device. Next, at step 726, the configuration information that is presently stored on the device is read. Typically, this information includes the vendor identification, and the amounts and types of memory required by the device. At step 728 that information is written to the allocated memory location allocated in step 725.

Next, as represented generally by box 728, the base address registers of the device are programmed. Specifically, at step 730, the first base address register is read in accordance with the PCI specification. This may be accomplished by writing FFFFFFFF to the base address register and then reading the base address register. Next, at step 732, if no base address registers remain (i.e., if all of the base address registers have already been read), the system continues on to the sequence of steps beginning at point A. However, when the base address register is being read, the process continues to step 734.

At step 734, if the low order bit of the base register is set (equals 1) then that base address register represents an I/O address and the process continues to the series of steps beginning with step 752 and continuing on FIG. 7B which are described below. Alternatively, if the lower order bit is not set, the base address register is a memory base address register and the system proceeds to step 736.

At step 736, the four low order bits from the base address register are masked as a preliminary step to determining the size of the memory required by the base address register. The determination of the amount of memory required by the base address register is commonly known to those of ordinary skill in the art as part of the standards of the PCI bus architecture and is therefore only outlined here.

Next, at step 738, the amount of memory required by the base address register is determined. Then, at step 740 the memory assignment for the base address register is determined with reference to the last memory address 420 in the bus information structure.

Next, as represented by box 742, after the memory assignment for the base address register is determined, then that memory assignment is compared to the memory start address 410 stored in the PCI bus information structure for that bus to ensure that the memory being assigned to that base address register is within the range allocated for devices on that bus. Then, in steps 746, 748 and 750, the proper value is written to the base address register according to the sequence of steps defined by the PCI specification.

Specifically, in step 746, the memory assignment for the base address register is written to the base address register. Then, at step 748, the base address register is read and at step 750, that value is used to set the memory last 420 (see FIG. 4) in the PCI bus information structure. As those of ordinary skill will recognize, reads to and writes from the base address register sometimes involve masking of selected bits as specified by the PCI bus standard. After step 750 has been completed, the process returns to step 730.

If the base address register had the lower order bit set at step 734, indicating that the base address register was for I/O, not memory, then the process proceeds to the series of steps box 752 which are set forth in FIG. 7B which will now be described.

At step 754 in FIG. 7B, the number stored in the base address register is read and the low order bit is masked. Next, at step 756, from that information the amount of I/O required by the base address register is determined according to the PCI specification, as is apparent to those of ordinary skill in the art.

Next, at step 760, the I/O assignment for the base address register is determined by using the last I/O address 422 (see FIG. 2) stored in the PCI bus information structure and the amount of I/O required by the base address register. Next, at step 764, a comparison is made to ensure that the I/O assignment given to the base address register does not fall outside the range of I/O allocated to devices on this bus. If it does, the process cannot be completed.

Then, at steps 768 and 770, according to the PCI specification, the I/O assignment for the base address register is written to the base address register. First, at step 768, the memory assignment is written to the base address register. Then, at step 770, the base address register is read. Next, at step 772, the information read from the base address register is used to set the last I/O 422 in the PCI bus information structure (see FIG. 4).

After the base address register has been programmed, the process returns to step 730 to read the next base address register. At step 732, if no further base address registers are present, the system next executes steps 774 through 786 in FIG. 7A.

First, at step 774, the device interrupt line is programmed with the proper ISA IRQ corresponding to the bus number. This information is stored as part of the PCI bus information structure. Next, at step 776, the device latency timer is programmed with a predefined value and at step 778, the device command register is also programmed with a predefined value.

Then, at step 782, the device PCI configuration information is read from the device and then written into the device information structure. Finally, at step 784, the created device information structure is inserted into the linked list associated with the bus which completes the process.

The invention may be embodied in other specific forms and arrangements without departing from its spirit or essential characteristics. For example, the information required to initialize a device being hot added can be maintained in a template. The template may be based upon the configuration information of an adapter of the same type located on a reference system. After following the traditional initialization process of configuring the reference system which includes some or all the devices on some or all the buses, the configuration information for each bus and each device in each bus slot is stored in memory. That information is used to build a template which is then used to supply the configuration information when a device is hot added. However, such a system requires that devices which are hot added can only be the identical type and in the same location as in the reference system.

Additionally, the memory structure can be in forms other than an array with linked lists, such as a table. The invention may also be applied to various bus architectures such as CardBus, Microchannel, Industrial Standard Architecture (ISA), and Extended ISA (EISA) and used with various operating systems such as Windows® NT. The application to other various architectures and operating systems will require that the method and system account for the specific requirements of those systems such as memory allocation and configuration information as will be recognized by those of ordinary skill in the art.

The invention has been shown and described with respect to particular embodiments. However, it will be understood by those skilled in the art that various changes may be made therein without departing from the spirit and scope of the invention. The scope of the invention is indicated by the appended claims rather than by the foregoing description. All changes which come within the meaning and range of equivalency of the claims are to be embraced within their scope.

What is claimed is:

1. A method of maintaining configuration information in a computer system when replacing devices connected to a bus in the computer system, the method comprising:

creating a memory structure containing configuration information for a bus and devices located on the bus;

replacing a device on the bus in the computer system with a replacement device;

retrieving the configuration information for the device replaced by the replacement device from the memory structure; and writing the retrieved configuration information to the replacement device.

2. The method of claim 1, wherein the act of creating the memory structure includes reading the configuration information for each device on the bus and storing the read configuration information.

3. The method of claim 2, wherein the act of creating the memory structure includes determining the start and end of the total memory allocated for all of the devices on the bus.

4. The method of claim 3, wherein the act of creating the memory structure includes determining the start and end of the total memory allocated for input/output (I/O) for all of the devices on the bus.

5. The method of claim 1, wherein the act of creating the memory structure includes determining the start and end of the total memory allocated for all of the devices on the bus.

6. A method of maintaining configuration information in a computer system when hot adding devices to a bus in the computer system, the method comprising:

creating a memory structure containing configuration information for a bus and devices located on the bus;

adding a device in a slot on the bus in the computer system;

reviewing the memory structure to determine whether the slot is assigned and if the slot is assigned then generating an error message and halting the process;

supplying the power to the slot;

retrieving selected configuration information for the added device from the memory structure; and writing the retrieved configuration information to the added device.

7. The method of claim 6, further including:

determining memory and input/output allocations for the added device based upon the added device and information in the memory structure.

8. The method of claim 7, wherein the act of creating the memory structure includes determining the start and end of the total memory allocated for all of the devices on the bus.

9. The method of claim 8, wherein the act of creating the memory structure includes determining the start and end of the total memory allocated for input/output (I/O) for all of the devices on the bus.

10. The method of claim 8, further including determining memory and input/output allocations for the added device based upon the added device and information in the memory structure and writing the determined memory and input/output allocations to the added device and to the memory structure.

11. The method of claim 10, further including redetermining the start and end of the total memory allocated for all of the devices on the bus after memory has been allocated for the added device.

12. The method of claim 10, further including redetermining the start and end of the total memory allocated for input/output (I/O) for all of the devices on the bus after memory has been allocated for I/O for the added device.

13. The method of claim 6, wherein the act of creating the memory structure includes reading the configuration information for each device on the bus and storing the read configuration information.

14. A method of maintaining configuration information in a computer system for use in connection with replacing and adding devices to a bus in the computer system, the method comprising:

creating a memory structure containing configuration information for a bus and devices located on the bus including determining the start and end of the memory allocated for the devices on the bus and determining the configuration information for the devices on the bus and storing the read configuration information in the memory structure;

replacing a device on the bus in the computer system with a replacement device;

retrieving the configuration information for the replacement device from the memory structure;

writing the retrieved configuration information to the replacement device;

determining memory allocations for a device added on the bus based upon the added device and information in the memory structure; and redetermining the start and end of the memory allocated for the devices on the bus after memory has been allocated for the added device.

15. The method of claim 14, wherein the act of creating the memory structure includes determining the start and end of the memory allocated for input/output (I/O) for the devices on the bus.

16. The method of claim 15, further including determining memory and input/output allocations for the added device based upon the added device and information in the memory structure and writing the determined memory and input/output allocations to the added device and to the memory structure.

17. The method of claim 15, wherein the act of creating the memory structure includes reading base address registers for the devices on the bus.

18. A method of maintaining configuration information in a computer system for use in connection with replacing and adding devices to a bus in the computer system, the method comprising:

creating a memory structure containing configuration information for a bus and devices located on the bus including determining the start and end of the memory allocated for the devices and determining the start and end of the memory allocated for input/output (I/O) for the devices on the bus, reading base address registers of the devices on the bus, determining the configuration information for the devices on the bus, and storing the read configuration information in the memory structure;

determining memory and input/output allocations for an added device based upon the added device and information in the memory structure;

writing the determined memory and input/output allocations to the added device and to the memory structure; and redetermining the start and end of the memory allocated for the devices on the bus after memory has been allocated for the added device.

19. A program storage device storing instructions that when executed by a computer perform the method comprising:

creating a memory structure containing configuration information for a bus and devices located on the bus;

determining whether a replacement device on the bus is identical to a device the replacement device replaced;

retrieving the configuration information for the device replaced by the replacement device from the memory structure; and writing the retrieved configuration information to the replacement device.

20. A program storage device storing instructions that when executed by a computer perform the method comprising:

creating a memory structure containing configuration information for a bus and devices located on the bus;

reviewing the memory structure to determine whether a slot in which an added device has been plugged is assigned and if the slot is assigned then generating an error message and halting the process;

retrieving selected configuration information for the added device from the memory structure;

writing the retrieved configuration information to the added device; and determining memory and input/output allocations for the added device based upon the added device and information in the memory structure.

* * * * *

UNITED STATES PATENT AND TRADEMARK OFFICE
CERTIFICATE OF CORRECTION

PATENT NO. : 6,148,355  
DATED : November 14, 2000  
INVENTOR(S) : Mallikarjunan Mahalingam Page 1 of 1

It is certified that error appears in the above-identified patent and that said Letters Patent is hereby corrected as shown below:

Column 1,  
Line 50, "disturbed", should read -- distributed --

Signed and Sealed this

Second Day of April, 2002

Attest:

Attesting Officer

JAMES E. ROGAN  
*Director of the United States Patent and Trademark Office*